(12) United States Patent
Brada et al.

(10) Patent No.: US 10,991,101 B2
(45) Date of Patent: Apr. 27, 2021

(54) MULTI-STAGE SEGMENTATION USING SYNTHETIC IMAGES

(71) Applicant: General Electric Company, Schenectady, NY (US)

(72) Inventors: Rafi Shmuel Brada, Herzliya (IL); Ron Wein, Herzliya (IL); Gregory Wilson, Wyoming, OH (US); Alberto Santamaria-Pang, Niskayuna, NY (US); Leonid Gugel, Herzliya (IL)

(73) Assignee: General Electric Company, Schenectady, NY (US)

( * ) Notice: Subject to any disclaimer, the term of this patent is extended or adjusted under 35 U.S.C. 154(b) by 192 days.

(21) Appl. No.: 16/299,743

(22) Filed: Mar. 12, 2019

(65) Prior Publication Data

US 2020/0294239 A1   Sep. 17, 2020

(51) Int. Cl.
*G06T 7/10*   (2017.01)

(52) U.S. Cl.
CPC ...... *G06T 7/10* (2017.01); *G06T 2207/20081* (2013.01); *G06T 2207/20084* (2013.01)

(58) Field of Classification Search
CPC ... G06T 2207/20084; G06T 7/10; G06T 7/11; G06T 2207/20081; G06T 2207/20021; G06T 2207/20076; G06T 2207/20221; G06T 7/194; G06T 9/002; G06T 17/00; G06T 7/143; G06T 7/215; G06N 3/0454; G06N 3/08; G06N 20/00; G06N 3/0445; G06K 9/627; G06K 2209/09; G06K 9/00624; G06K 9/2054; G06K 9/3241; G06K 9/46; G06K 9/6267; G06K 9/34; G06K 2209/05; G06K 9/00456; G06K 9/00463; G06K 9/3233; G06K 9/00127; G06K 9/00221; G06K 9/00362; G06K 9/00765; G06K 9/6217; G06K 9/628; G06K 9/6292

See application file for complete search history.

(56) References Cited

U.S. PATENT DOCUMENTS

| 5,706,364 | A  | * | 1/1998 | Kopec | G06K 9/6255 |
| | | | | | 382/159 |
| 7,630,517 | B2 | * | 12/2009 | Mirowski | G01V 11/00 |
| | | | | | 382/109 |
| 7,958,063 | B2 | * | 6/2011 | Long | G06K 9/6269 |
| | | | | | 706/12 |
| 8,515,172 | B2 | * | 8/2013 | Varekamp | G06T 7/136 |
| | | | | | 382/173 |

(Continued)

*Primary Examiner* — Manav Seth
(74) *Attorney, Agent, or Firm* — Dority & Manning, P.A.

(57) ABSTRACT

The example embodiments are directed to refinement process for generating an accurate image segmentation map. A refinement network may enhance an initially generated segmentation map using a model that is trained using synthetic images. In one example, the method may include storing an image of content which includes a plurality of categories of data, receiving an initial segmentation map of the image, the initial segmentation map comprising pixel probability values with respect to the plurality of categories, executing a refinement predictive model on the initial segmentation map and the image to generate a refined segmentation map, wherein the predictive model is trained using synthetic images of the plurality of categories of data, and generating a segmented image based on the refined segmentation map.

20 Claims, 8 Drawing Sheets

(56) References Cited

U.S. PATENT DOCUMENTS

| | | | |
|---|---|---|---|
| 9,047,513 B2* | 6/2015 | Derzhi | G06T 15/08 |
| 9,158,995 B2* | 10/2015 | Rodriguez-Serrano | G06K 9/6217 |
| 9,280,819 B2* | 3/2016 | Codella | G06K 9/621 |
| 9,754,153 B2* | 9/2017 | Li | G06K 9/4652 |
| 9,767,565 B2* | 9/2017 | Estrada | G06K 9/6267 |
| 9,996,890 B1* | 6/2018 | Cinnamon | G06K 9/627 |
| 10,235,601 B1* | 3/2019 | Wrenninge | G06K 9/6256 |
| 10,534,962 B2* | 1/2020 | Hovden | G06T 15/04 |
| 10,599,924 B2* | 3/2020 | Yang | G06K 9/34 |
| 10,600,185 B2* | 3/2020 | Yang | G06T 7/187 |
| 10,624,558 B2* | 4/2020 | Ceccaldi | G06T 7/11 |
| 10,643,320 B2* | 5/2020 | Lee | G06T 5/005 |
| 10,679,046 B1* | 6/2020 | Black | G06N 3/084 |
| 10,726,300 B2* | 7/2020 | Berseth | G06K 9/6257 |
| 10,733,788 B2* | 8/2020 | Ceccaldi | G06N 3/006 |
| 10,776,663 B1* | 9/2020 | Bogdanovych | G06N 3/04 |
| 2002/0110283 A1* | 8/2002 | Fan | G06K 9/00456 382/264 |
| 2003/0147558 A1* | 8/2003 | Loui | G06K 9/6226 382/225 |
| 2014/0270350 A1* | 9/2014 | Rodriguez-Serrano | G06K 9/6267 382/103 |
| 2018/0247201 A1* | 8/2018 | Liu | G06N 3/088 |
| 2019/0046068 A1* | 2/2019 | Ceccaldi | G06T 7/11 |
| 2019/0065818 A1* | 2/2019 | Lee | G06T 5/003 |
| 2019/0066281 A1* | 2/2019 | Zheng | G06K 9/6256 |
| 2019/0080205 A1* | 3/2019 | Kaufhold | G06K 9/6257 |
| 2019/0287292 A1* | 9/2019 | Ceccaldi | G06T 7/11 |
| 2019/0370666 A1* | 12/2019 | Ros Sanchez | G06N 3/088 |
| 2020/0082535 A1* | 3/2020 | Lindskog | G06K 9/00228 |
| 2020/0184278 A1* | 6/2020 | Zadeh | G06F 16/953 |

* cited by examiner

FIG. 2A
(Synthetic Image)
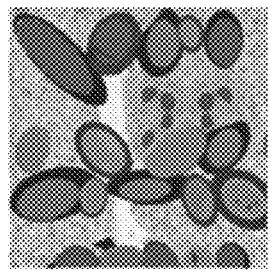
Grey-Scale Image
(Synthetic)
210
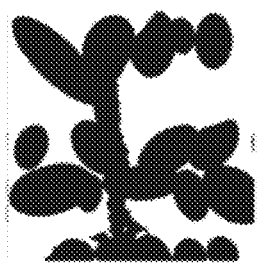
Ceramic Matrix
Population
211
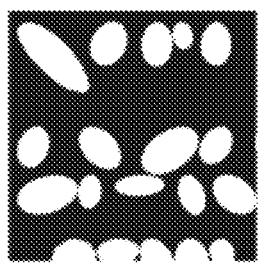
Ceramic Fiber
Population
212
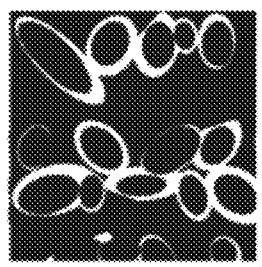
Coating Material
Population
213
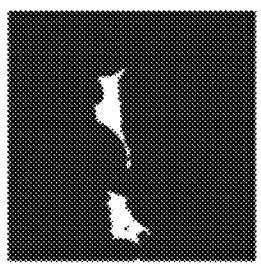
Metal Silicon
Population
214

FIG. 2C

Probability Map 230

| Pixel\Pixel | 1 | 2 | 3 | 4 | ... |
|---|---|---|---|---|---|
| 1 | (.2,.8.,0,0) | (.2,.8.,0,0) | (.3,.7.,0,0) | ... | |
| 2 | (.1,.9.,0,0) | (.1,.9.,0,0) | (.2,.8.,0,0) | ... | |
| 3 | (0,1,0,0) | (0,1,0,0) | (.1,.9,0,0) | ... | |
| 4 | (0,1,0,0) | (0,1,0,0) | (0,1,0,0) | ... | |
| 5 | (0,1,0,0) | (0,1,0,0) | (0,1,0,0) | ... | |
| 6 | (0,1,0,0) | (0,.8,0,.2) | (0,.6,0,.4) | ... | |
| 7 | (0,1,0,0) | (0,.8,0,.2) | (0,.6,0,.4) | ... | |
| 8 | (0,1,0,0) | (0,.8,0,.2) | (0,.6,0,.4) | ... | |
| 9 | (0,1,0,0) | (0,1,0,0) | (0,.5,0,.5) | ... | |
| 10 | (0,1,0,0) | (0,1,0,0) | (0,1,0,0) | ... | |
| 11 | (0,1,0,0) | (0,.9,.1,0) | (0,1,0,0) | ... | |
| 12 | (0,1,0,0) | (0,.8,.2,0) | (0,1,0,0) | ... | |
| 13 | (0,.6,.4,0) | (0,.6,.4,0) | (0,.8,.2,0) | ... | |
| 14 | (0,.3,.7,0) | (0,.3,.7,0) | (0,.3,.7,0) | ... | |
| 15 | (0,.1,.9,0) | (0,.1,.9,0) | (0,.1,.9,0) | ... | |
| 16 | (0,0,1,0) | (0,0,1,0) | (0,0,1,0) | ... | |
| 17 | (0,0,1,0) | (0,0,1,0) | (0,0,1,0) | ... | |
| ... | ... | ... | ... 232 | ... | |

MULTI-STAGE SEGMENTATION USING SYNTHETIC IMAGES

BACKGROUND

Image segmentation is the process of partitioning a digital image into multiple segments (i.e., pixel sets). Image segmentation can simplify and/or change the representation of an image into something that is more meaningful and easier to analyze. Image segmentation is typically used to locate objects and boundaries such as lines, shape boundaries, objects, etc., in images. An image may contain thousands (or even millions) of pixels. Image segmentation is the process of assigning a label to every pixel in an image such that pixels with the same label share certain characteristics.

The result of image segmentation is a set of segments which can collectively cover the entire image. Each of the pixels in a region are similar with respect to some characteristic or computed property, such as color, intensity, or texture. Adjacent regions are significantly different with respect to the same characteristics.

In many computer vision tasks such as inspection and process control, there is a need to accurately segment certain image parts (e.g., materials, etc.) which appear in the image. While deep learning methods have proven successful in semantic segmentation tasks there is a challenge in obtaining highly accurate segmentation maps. In some cases, sub-pixel accuracy is required. One of the difficulties is the need for large amounts of accurately (often subpixel) labeled data for training a machine learning algorithm. Accordingly, what is needed is an improved mechanism for image segmentation.

SUMMARY

The embodiments herein improve upon the prior art through a two-stage image segmentation process which is based on the additional use of synthetically generated images. Traditional image segmentation is based on raw image content. While the raw data helps capture a real-world scenario, the raw data lacks accurate ground truth labeling needed for testing and or tuning an accurate segmentation algorithm. The presence of noise, error, appearance variations and other factors prevent accurate predictive model training without much manual work for accurately labeling the data. The example embodiments improve upon related image segmentation techniques through a refinement network which refines an initially or roughly generated segmentation map. The refined segmentation map is generated using a refinement network that is trained on synthetic images. The synthetic images may be composed of image templates (accurately segmented image pieces) which have a known ground truth.

According to various embodiments, a two-stage approach is implemented in which the first stage sees the real statistics of the data but is only semi-supervised together while a second stage is trained on a more limited data set which is highly accurate provides a solution which is simple to train, robust to the variations in the data and has a high degree of accuracy. During the first stage of the process, an image may be processed using an initial predictive model which generates an approximate or rough segmentation map of the image. The initial predictive model is trained using real image data. During the second stage, the initially generated segmentation map and the full representation of the image may be input to a refinement network (which includes an additional predictive model) which further refines the initially generated segmentation map. The refinement network may include a neural network that is trained using the synthetic images instead of actual images which lack accurate labeling. Each category of material and or functional element may have one or more representative synthetic images that define a ground truth of the material in the image. The refined segmentation map generated by the refinement network can be used to segment the image to generate a more accurate/realistic image segmentation.

In an aspect of an example embodiment, a computing system may include a storage configured to store an image of content which includes a plurality of categories of material and or functional elements, and a processor configured to receive an initial segmentation map of the image, the initial segmentation map comprising pixel probability values with respect to the plurality of categories, and execute a refinement predictive model on the initial segmentation map and the image to generate a refined segmentation map, the refinement predictive model being trained based on synthetic images of the plurality of categories of materials and or functional elements, wherein the processor may generate a segmented image based on the refined segmentation map and may output the segmented image for display.

In an aspect of another example embodiment, a method may include storing an image of content which includes a plurality of categories of material, receiving an initial segmentation map of the image, the initial segmentation map comprising pixel probability values with respect to the plurality of categories, executing a refinement predictive model on the initial segmentation map and the image to generate a refined segmentation map, wherein the predictive model is trained based on synthetic images of the plurality of categories of materials, and generating a segmented image based on the refined segmentation map and outputting the segmented image for display.

Other features and aspects may be apparent from the following detailed description taken in conjunction with the drawings and the claims.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 2A is a diagram illustrating a synthetic image and images showing the ground truth probability maps for the four classes in accordance with an example embodiment.

FIG. 2C is a diagram illustrating a class probability map generated of an image in accordance with an example embodiment.

Figure 1:
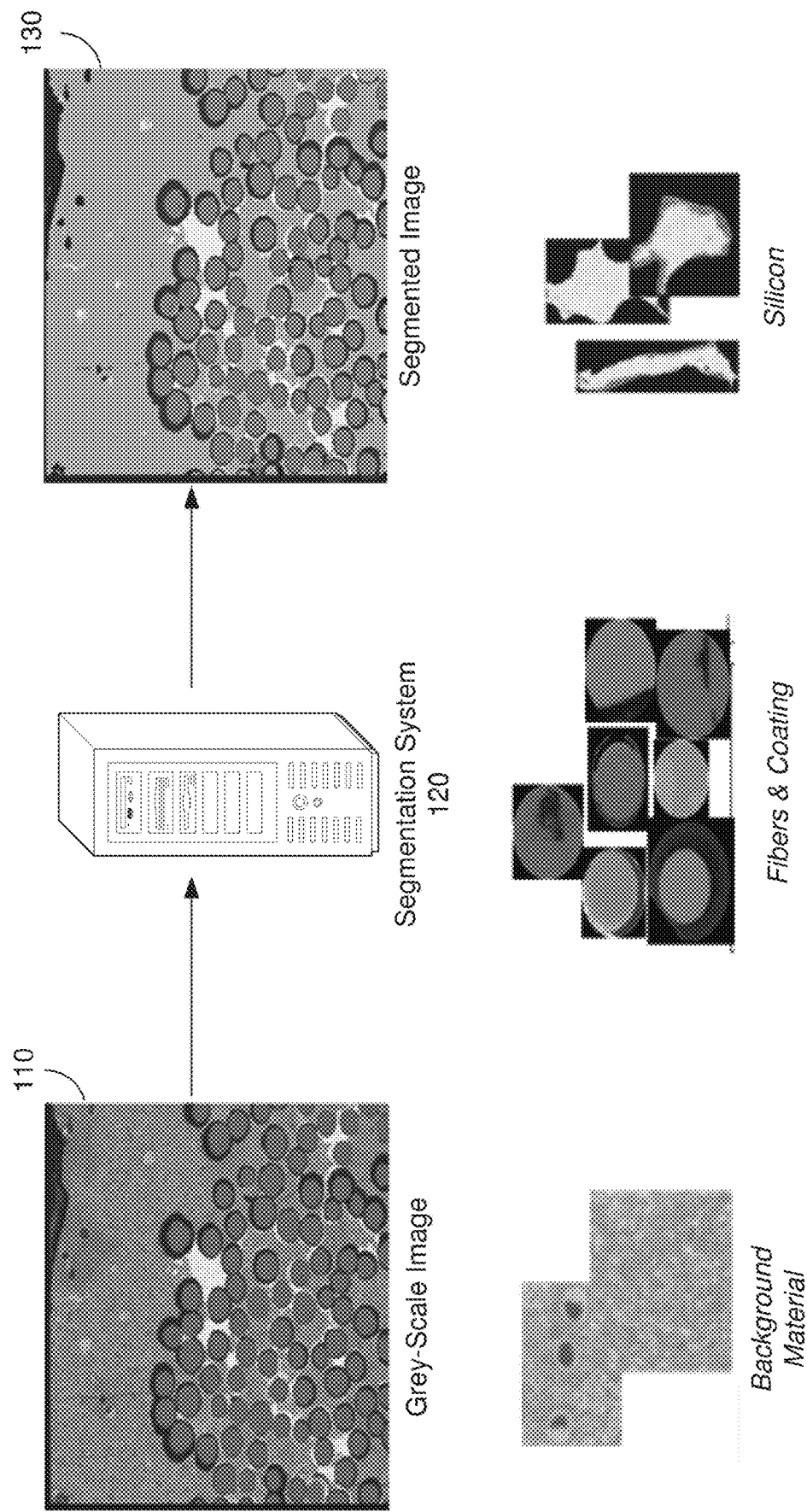
FIG. 1 is a diagram illustrating a segmentation system for generating a segmented image in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

Image segmentation is a process of converting an image into a set of smaller regions within the image. An image may be enhanced or otherwise improved by providing clarity around data items within the image such as materials, objects, etc. During segmentation, the image may be decomposed into smaller parts (or regions) for further analysis. Each region may correspond to a data category of the image. The categories (or regions) may be different based on the content being analyzed. For example, a human face may be decomposed into different categories for ears, mouth, nose, eyes, hair, and the like. As another example, a complex material image such as ceramics matrix composites (CMCs) may be decomposed into categories such as fiber, coating, silicon, background material, and the like. It should be appreciated that image segmentation is not limited to any particular type of image or content therein, and can be applied to any type of image.

Once the image is broken into smaller parts, the segmentation process may change or transform the representation of each part into higher-level units that are more meaningful (e.g., clearer, sharper contrasts, more discernible boundaries, etc.) For example, each pixel may be assigned to a category from among a plurality of data categories.

According to various embodiments, a segmentation map (also referred to as a probability map, feature map, etc.) is created in which each pixel may be marked with a vector identifying a most-likely category of the pixel through a two-stage segmentation process. During a first stage, the system herein may input the initial image (e.g., a three-channel RGB image, a single-channel gray scale image, depending on the nature of the problem at hand, etc.) into a U-net architecture that creates a rough segmentation map for the pixels of the image. The U-net may be trained using real image data of the content being analyzed, or on a mixture of real data and synthetic data. Next, a second stage of the segmentation process may refine the initially generated segmentation map using a refinement network (also referred to herein as a cascaded network) that is trained based on synthetic (e.g., artificially created) images. An enhanced segmentation map may be output from the refinement network and used to create a segmented image for display.

The artificially-created synthetic images may be composed of image templates for which a ground truth is known and accurate. The term "ground truth" refers to an image where the data categorization is known or proved. The synthetic images may be created using a data augmentation tool which stores a library of template image pieces (real image pieces). Each template contains a gray scale image of a relevant segment and a related segmentation mask indicating accurately the pixels belonging to the segment, e.g. using an associated probability map. A user (or the system) can create as many synthetic images as desired for each type of category of data to be segmented. The library may include a repository of very accurate templates where where each component is known. From this template library, many synthetic images can be created. The templates may be pieces of real images that are cut out from old images. Meanwhile, the synthetic images may be a combination of multiple template parts. For example, the resulting synthetic images are composed of many templates which have been added together.

It is also possible that certain components are artificially added to the synthetic images based on a prior knowledge of the geometry of certain objects that may appear in real images. For example, in the CMC segmentation problem the fibers and their coatings have an elliptical shape, so it is possible to generate ellipses with some pre-defined textures and embed them into the synthetic image.

The synthetic images may have an accurate ground truth (accurate segmentation) but they may not represent the full statistics of the real world (noise, error, and other factors) because they are based off templates. To address this, the segmentation process may initially perform a rough segmentation using an initial predictive model during the first phase that is based on real world image data (not just templates) to create an initial segmentation of the data. In some embodiments, the initial predictive model may be trained on real images and synthetic images, or just real images. After the first segmentation stage, the segmentation map may include a vector representation in which each pixel is given a set of probabilities (one for each category type). The probabilities may represent a probability that the pixel is associated with each category of data.

During a second segmentation phase, the image and the initial segmentation map may be input into a refinement network. The refinement network may process the input image based on a predictive model that is trained from only the segmented images. Furthermore, the refinement network may modify (e.g., enhance) the probability values included in the initial segmentation map to generate an enhanced segmentation map. The example embodiments perform image segmentation using an architecture that is based on real data and synthetic data. Furthermore, once the system is up and running, the refinement network can be trained using enhanced results created by the system to further improve the accuracy of the image segmentation. A bootstrapping process occurs and after a few iterations the performance gets better because it converges to accurate results.

FIG. 1 illustrates a segmentation system 120 for generating a segmented image in accordance with an example embodiment. For example, a computing environment 100 includes the segmentation system 120 which may receive an image 110 and convert the image into a segmented image 130. In this non-limiting example, the image 110 is of a complex CMC and the segmentation includes four categories of data (e.g., four materials of interest) including background material, fibers, coating, and silicon. Depending on the domain of the image, the categories may be different, and should not be construed as being limited to the example shown in FIG. 1.

In some embodiments, the segmentation system 120 may perform a multi-stage process which includes a first segmentation phase based on a predictive model trained using real image data and a second segmentation phase based on a refinement network that is trained using synthetic images. However, in some embodiments, the two phases may be performed by different devices. For example, the first segmentation phase may be performed by another device and provided to the segmentation system 120 which then performs the second segmentation phase. However, for convenience of description, both the first and second phases of the image segmentation process may be performed by the segmentation system 120 in this example.

The segmentation system 120 may generate an accurate segmentation of the image 110 using deep learning. In many computer vision tasks, especially for inspection and process control, there is a need to accurately segment certain parts/materials appearing in the image. According to various embodiments, the segmentation system 120 may perform a first phase of the segmentation process by running a predictive algorithm on the image (e.g., a gray-scale image) to generate an initial segmentation map. The initial predictive algorithm may be trained on real-world image data for the domain. The initial predictive algorithm can generate a rough approximation of the segmentation map based on real data which can account for factors such as noise, error, and the like.

During the second phase of the segmentation process, the segmentation system 120 may input the gray-scale image and the initially generated segmentation map into a refinement network. Through the refinement network, a second predictive algorithm may be applied to the image and the initially generated segmentation map to generate a refined segmentation map. The second predictive algorithm may be trained using synthetic images instead of real images. The benefit of using synthetic images is that the ground truth is known very accurately. As a result, a neural network or other predictive algorithm used by the refinement network may be very accurate. Based on the refined segmentation map, the segmentation system 120 may generate a segmented image such as image 130 shown in the example of FIG. 1.

In some embodiments, the segmentation system 120 may provide a data augmentation tool together with the cascaded deep learning architecture which includes both the initial predictive model and the refinement network. The data augmentation tool may store a relatively small number of templates created from accurately segmented real image patches in a library or repository of templates. The augmentation tool may then be used to generate synthetic images having a known and accurate ground truth labeling. The augmentation tool can be output via a user interface by the segmentation system 120 and may include controls and input fields allowing a user to select image template pieces from real images for which a ground truth is known already.

An example application is a microscopy-based inspection of Ceramics Matrix Composites (CMC) materials being used among other applications, for producing parts of jet engines or the like. CMCs are made from special silicon carbide ceramic fibers locked inside a ceramic matrix and covered with a thermal barrier coating. As part of the manufacturing process control, samples of the manufactured CMC plies are cut, polished and inspected under a microscope. FIG. 1 shows a microscopy image of a CMC cross section. These very large high-resolution microscopy images need to be automatically analyzed for process control purposes. The analysis requires the accurate segmentation of the image identifying the fibers, the coating, the metal silicon and the background matrix.

FIG. 2A illustrates a synthetic image and four related probability maps (ground truths) in accordance with an example embodiment. In this example, a gray-scale image 210 of a CMC is shown which is to be segmented. Furthermore, in this example, four synthetic images 211, 212, 213, and 214 may be created and used to train the refinement network. Here, each segmented image 211-214 corresponds to a different category of data in the gray-scale image 210 (e.g., background matrix, fiber, coating, and silicon) among the four categories. In particular, synthetic image 211 corresponds to background matrix material, synthetic image 212 corresponds to fiber, synthetic image 213 corresponds to coating, and synthetic image 214 corresponds to silicon. During training, gray-scale image 210 will be used as input to the refinement network while images 211-214 will be used to calculate the loss function of the refinement network.

The system may provide a data augmentation tool for generating high accuracy synthetic image sets to be used in the training process. The data augmentation tool enables the user to manually curate a highly accurate template library. The template library may contain small gray scale images of the different segments such as fibers, coatings, background material, silicon, etc. together with their respective accurately marked segmentation maps. The data augmentation tool is used to generate thousands of images by randomly selecting different templates and composing synthetics images. For each generated image random noise shape and color deformations are applied to the templates. The resulting data set consists of sets of synthetic images 210-214. Each set of synthetic images may include the generated gray scale image 210 together with the probability maps (synthetic images 211-214) for the different categories of data including the fiber, the coating, the background matrix, and the metal silicon. In addition, other components may be embedded into the synthetic image base on prior geometric knowledge, in which case the corresponding probability maps are modified accordingly.

Figure 2B:
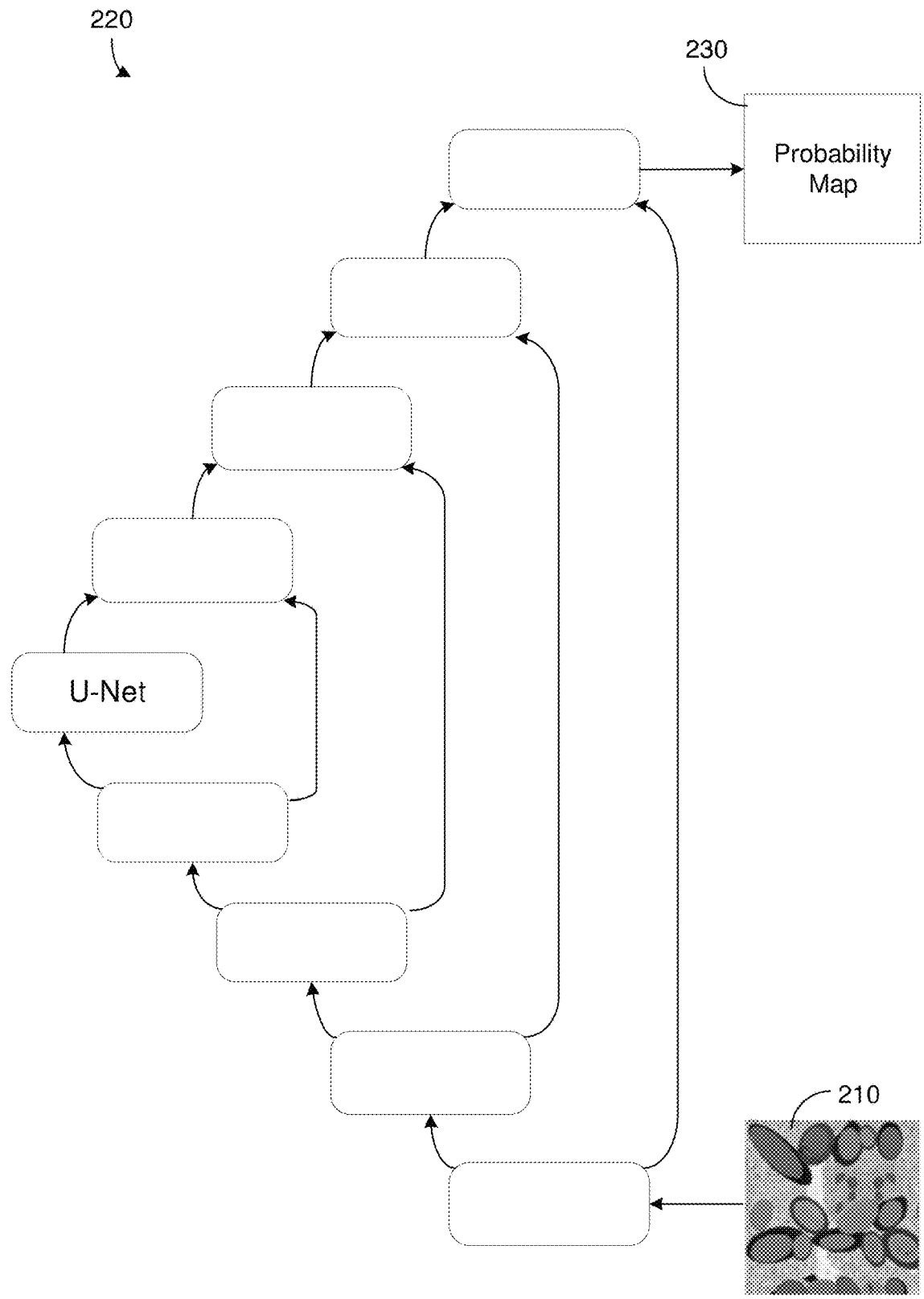
FIG. 2B is a diagram illustrating a U-net architecture of an initial predictive network in accordance with an example embodiment.

FIG. 2B illustrates a U-net architecture 220 of an initial predictive network for performing a first stage of the segmentation process in accordance with an example embodiment. The U-net is composed of several down-stream layers and a similar number of up-stream layers, where at each down-stream layer the resolution of the feature maps decreases, while the number of features increases, and at each up-stream layer the resolution of the feature maps increases, while the number of features decreases. In addition, each up-stream layer accepts a concatenation of the up-sampled output of the previous up-stream layer and the raw output of the down-stream layer (prior to down-sampling) with the same resolution. This architecture is very suitable for performing segmentation tasks, as it enables the model to learn the representation of high-level features in the image, but at the same time maintain very high levels of pixel accuracy. However, it should be noted that the U-net model described in this Application is just a specific embodiment of the described Method, and a model with a different architecture may server as well for the performing the first segmentation phase.

The first segmentation phase may include generating an initial (rough estimate) of a segmentation map for the pixels of an input gray scale image 210. An initial segmentation map (coarsely segmented data) may be generated by inputting the image 210 into the U-net 220 shown in FIG. 2B. In this example, the U-net 220 may process the initial image 210 to generate an initial segmentation map 230 which includes probabilities on a per-pixel basis. For example, four probabilities (one for each category of data) included in the image domain may be determined for each pixel thereby creating a map of pixel-by-pixel probability vectors. An example of the generated segmentation map 230 is shown in FIG. 2C which includes a vector 232 for each pixel. Each vector 232 may include a vector of probabilities that the pixel belongs in one of the four classes for the respective domain.

The coarsely segmented data set (segmentation map 230) is generated by the U-net 220 which is trained using real images to create an approximate segmentation calculated using a classical segmentation algorithm. This set captures that true statistics of the materials and the related gray scale images, but the segmentation is less accurate and may have a certain degree of labeling errors. The U-Net receives as input the gray scale image 210 and, in this example, is trained to output the per pixel the probability values for belonging to each the four classes (background, fiber, coating, silicon). A pixel wise segmentation map 230 is created by assigning to each pixel the class with the highest probability. In some embodiments, the U-Net 220 may be trained using the real image data set together with the synthetic data set.

Figure 3:
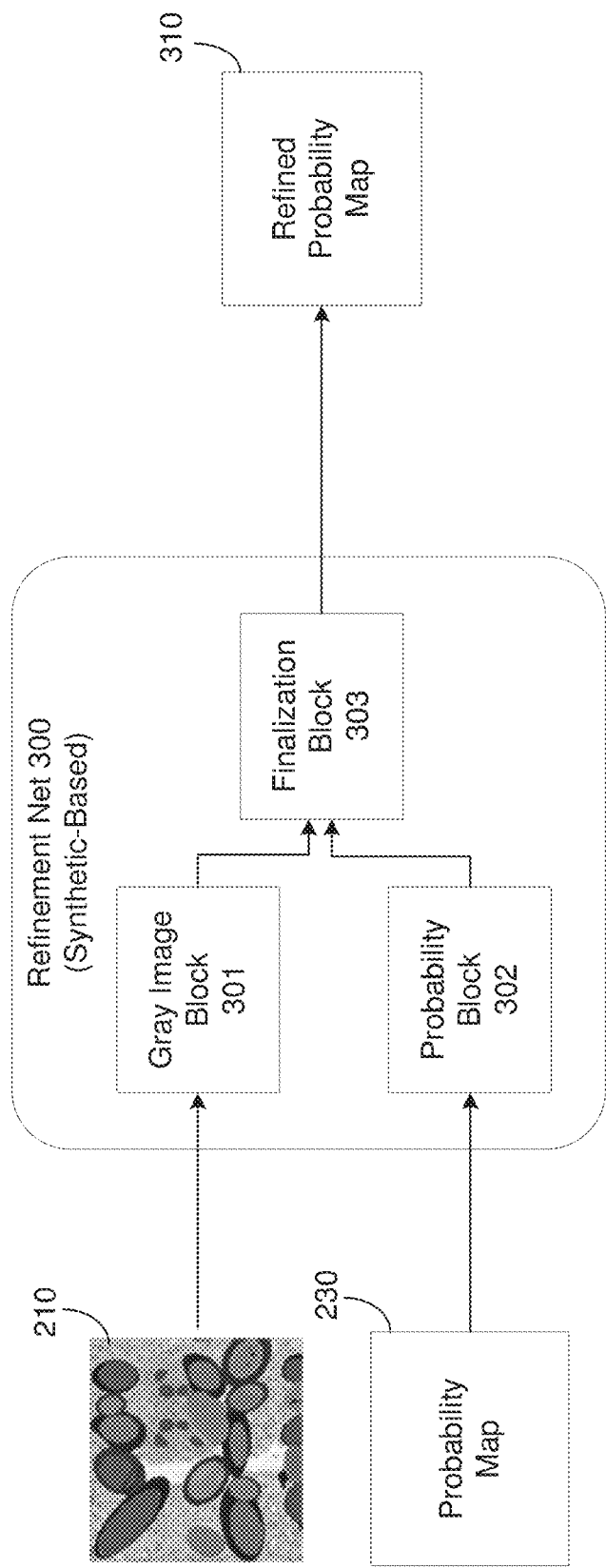
FIG. 3 is a diagram illustrating a refinement network for refining a segmentation map in accordance with an example embodiment.

The deep learning architecture used by the segmentation system 120 may include both the U-net 220 shown in the example of FIG. 2B, and a refinement network such as refinement network 300 shown in the example of FIG. 3. The U-net 220 is used to generate a first approximation of the segmentation map 230. A cascaded network (i.e., the refinement network 300) may receive the original image 210 together with the approximate segmentation map 230 and produce an accurate segmentation map 320 during a second stage of the segmentation process. Meanwhile, the U-net 220 may be trained on a mix of real data with limited accuracy together with highly accurate augmented synthetic data. In contrast, the refinement network 300 may be trained using only the high accuracy augmented synthetic image data for which a ground truth is known.

Referring to FIG. 3, the second stage of the segmentation process relies on segmentation performed via the refinement network 300 which may include a cascaded neural network. The refinement network 300 may receive as input both the original gray scale image 210 and the output of the U-Net 220, i.e. the segmentation map 230 with the four channels of class probability per pixel. The refinement network 300 has a separate block 301 and 302 for processing the gray scale image 210 and the segmentation map 230. The output of the separate blocks is input as channels to the final processing block 303 which outputs a refined probability map 310. As one example, the refinement network 300 may be trained separately using a pretrained U-Net and only using the highly accurate synthetic data.

The two-stage segmentation process enables accurate segmentation with sub-pixel accuracy using deep learning methods by eliminating the need to manually curate a large and accurate database (thousands of objects) for training the network. The use of deep learning is essential for eliminating many of the shortcomings of classical methods. Classical methods suffer from segmentation errors and the constant need to fine tune parameters and to adjust to variations in the data. According to various embodiments, the two-stage approach where the first stage sees the real statistics of the data but is only semi-supervised together with a second stage that is trained on a more limited data set which is highly accurate provides a solution which is simple to train, robust to the variations in the data and has a high degree of accuracy. The need for an accurate and a robust segmentation arises in many inspection and process control applications.

A library of synthetic images may be uniquely created based on an image domain. For example, facial images may have different segment categories and different synthetic images than CMC based images. The segmentation process may determine, per pixel, what category of data is associated with the pixel. The system may label or otherwise categorize each pixel into one of the material types. However, in some cases, the system may categorize a pixel into multiple materials type (object level). Based on the raw data, the system may convert each pixel into a label identifier, and then take the maximum probability (which probability is the greatest) and categorize that pixel as belonging to the category. The system can generate the segmented image by assigning each pixel its labeled value. Furthermore, the system may take the segmented image and make measurements of individual objects in the image (post-processing) of the segmented image.

Figure 4:
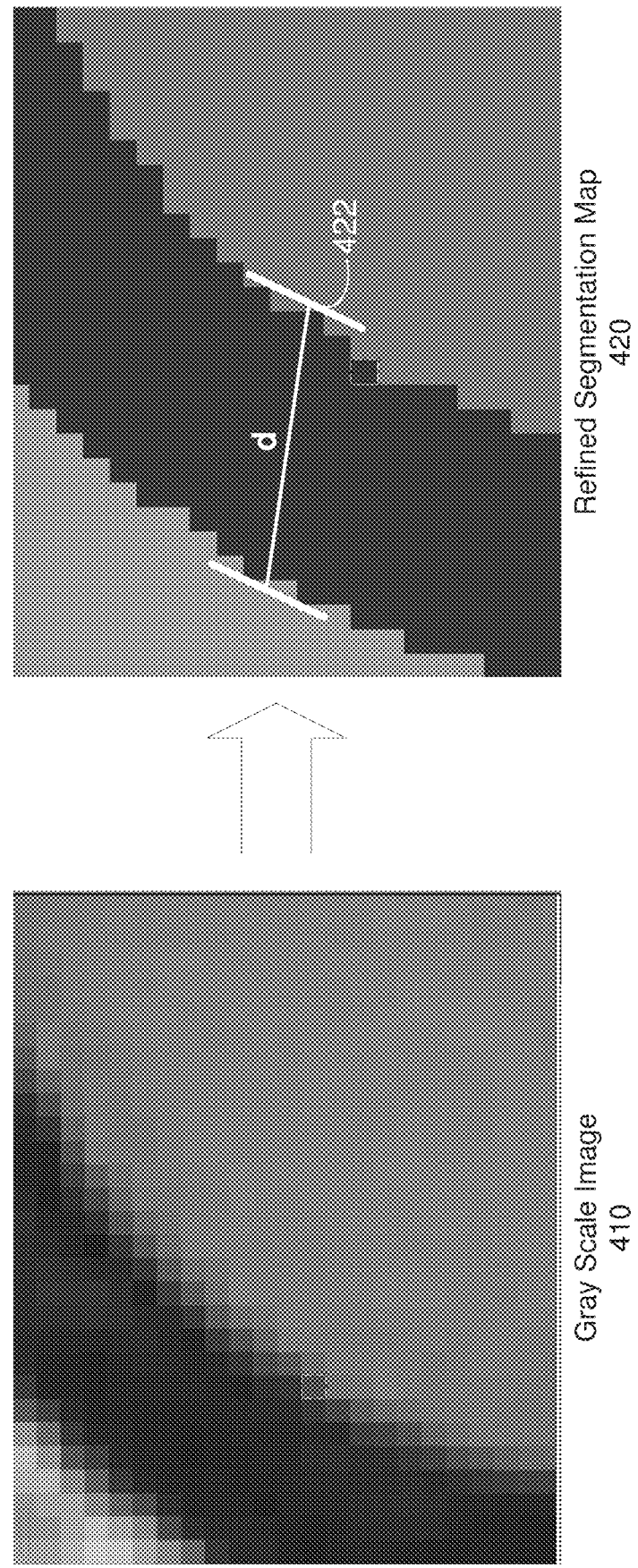
FIG. 4 is a diagram illustrating a post-processing operation on a segment image in accordance with an example embodiment.

FIG. 4 illustrates a post-processing operation on a segment image in accordance with an example embodiment. Referring to FIG. 4, a difference in clarity between an initial image 410 and a segmented image 420 generated through the two-stage segmentation process described by the example embodiments is shown. The two-stage segmentation process enables pixels to be categorized into categories of data. Furthermore, in some embodiments, the two-stage process can provide even more refined accuracy by enabling sub-pixel categorization of data (e.g., labelling a pixel as being in more than one category of data). Edge detection techniques could be used on the probability maps to localize the boundaries between different segment with sub-pixel accuracy. The subpixel accuracy could be used by working either directly with the probability values, for example, computing the area of a segment by summing the probability values, or by generating a higher resolution pixel wise segmentation map or by describing the boundaries using contour elements. This can be especially useful around edges, or the like, of image content.

For example, post-processing may be performed to measure the distance (d) between edges of material to create a measurement 422. The post-processing may produce quantization files. In the examples herein, a CMC image may be composed of multiple layers of fibers which are distributed in a panel. The segmented image may be used to measure each individual layer. Then within every layer the post processing may further identify geometries of the fibers, and the like. Furthermore, comprehensive labeling may be performed to identify fibers of interest. The refined accuracy of the two-stage segmentation approach can be applied to microscopy, healthcare (identifying fibers), facial recognition, and many other areas of imaging.

Figure 5:
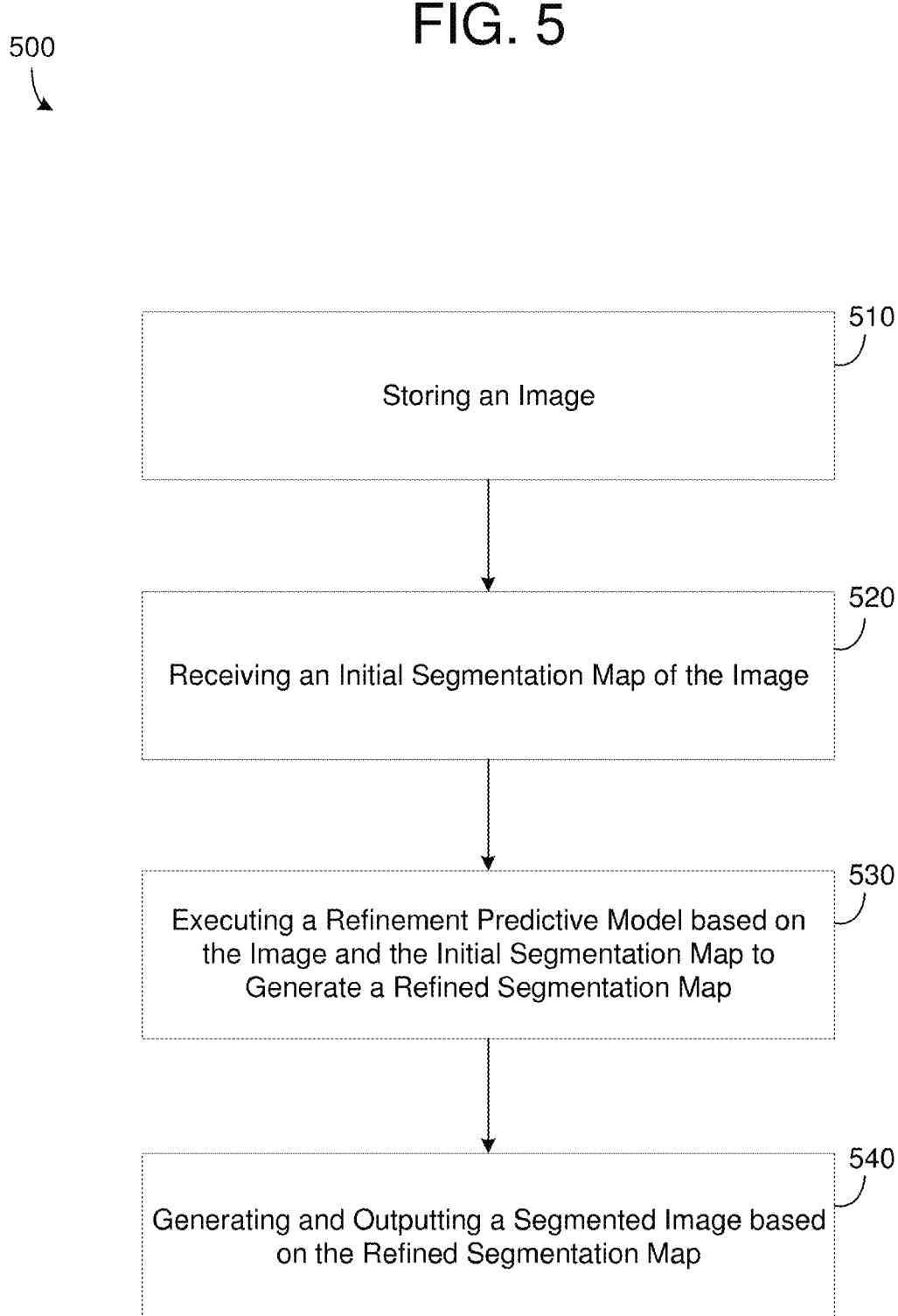
FIG. 5 is a diagram illustrating a method for generating a refined segmentation map in accordance with an example embodiment.

FIG. 5 illustrates a method 500 for generating a refined image segmentation map in accordance with an example embodiment. For example, the method 500 may be performed by a database, a cloud platform, a server, a user device, a combination of devices, and the like. Referring to FIG. 5, in 510, the method may include storing an image of content which includes a plurality of categories of data. For example, the categories of data may correspond to regions in the image. The categories of data may be different based on a domain of the image content. In some embodiments, synthetic images of each data category may be stored. The synthetic images may be artificially created images for which a ground truth is known. For example, the synthetic images may include at least one synthetic image dedicated to each category of data from among the plurality of categories of data.

In 520, the method may include receiving an initial segmentation map of the image, where the initial segmentation map includes pixel probability values with respect to the plurality of categories. For example, the pixel probabilities may indicate the probabilities that a pixel belongs in each of the respective categories. The number of probabilities may be the same as the number of data categories. Therefore, a plurality of probabilities may be provided for each pixel (referred to as a probability vector). In some embodiments, the method may further include generating the initial segmentation map of the image via execution of on an initial predictive model trained on real images of the plurality of categories of data. For example, the initial predictive model may be a U-net architecture which is trained using both real image data and synthetic image data.

In 530, the method may include executing a refinement predictive model on the initial segmentation map and the image to generate a refined segmentation map. The refinement predictive model may be referred to as a refinement network. In some embodiments, the refinement predictive model may be trained based on synthetic images of the plurality of categories of data. In 540, the method may include generating a segmented image based on the refined segmentation map and outputting the segmented image for display. The generating may include assigning a category of data to each pixel based on the probabilities in the refined segmentation map. In some embodiments, the refinement predictive model may include a cascaded neural network that separately processes a gray-scale representation of the image and the initial segmentation map, and combines the separately processed results of both to generate the refined segmentation map.

In some embodiments, the method may further include outputting a data augmentation interface that enables a user to build template pieces and/or synthetic images using pieces of real images where the ground truth is known and accurate. In some embodiments, the assigned pixel values may be split into sub-pixel values in which a pixel is actually assigned to more than one category of data. In some embodiments, the executing of the refinement predictive model may convert a pixel categorization included in the initial segmentation map into a sub-pixel categorization in the refined segmentation map.

Figure 6:
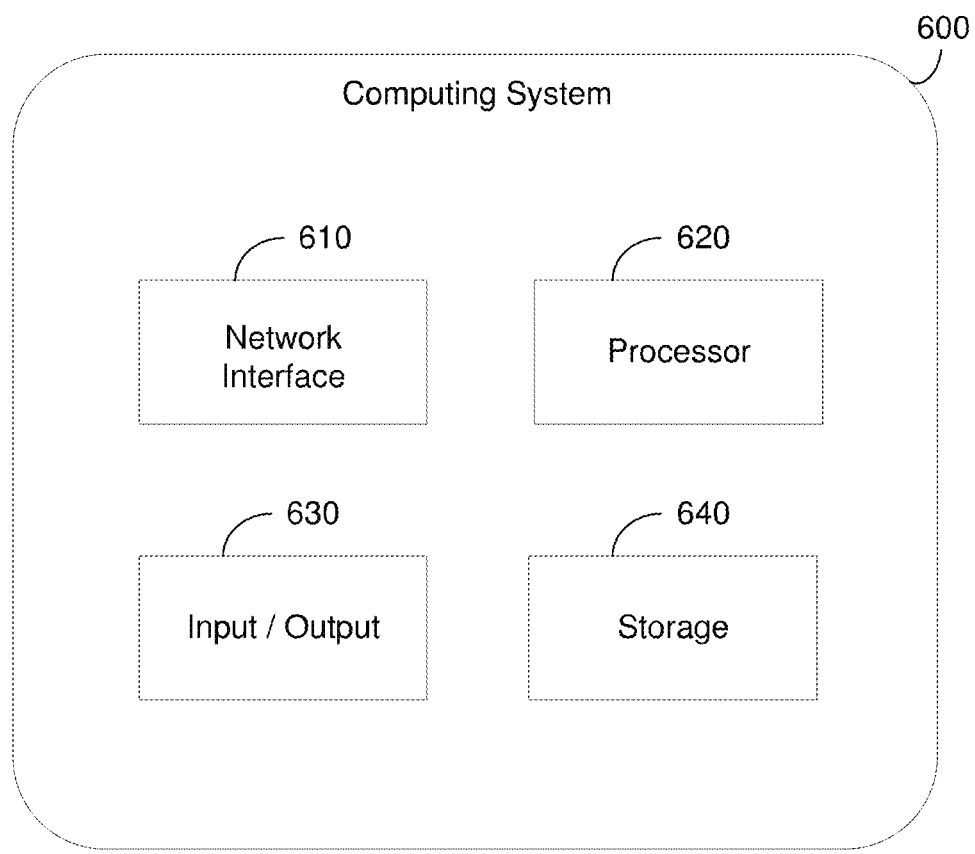
FIG. 6 is a diagram illustrating a computing system for use with any of the example embodiments.

FIG. 6 illustrates a computing system 600 in accordance with an example embodiment. For example, the computing system 600 may be a cloud platform, a server, a user device, or some other computing device with a processor. Also, the computing system 600 may perform the method of FIG. 5. Referring to FIG. 6, the computing system 600 includes a network interface 610, a processor 620, an input/output 630, and a storage device 640. Although not shown in FIG. 6, the computing system 600 may include other components such as a display, a microphone, a receiver/transmitter, and the like. In some embodiments, the processor 620 may be used to control or otherwise replace the operation of any of the components of the computing system 600.

The network interface 610 may transmit and receive data over a network such as the Internet, a private network, a public network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. The input/output 630 may be a hardware device that includes one or more of a port, an interface, a cable, etc., that can receive data input and output data to (e.g., to an embedded display of the device 600, an externally connected display, an adjacent computing device, a cloud platform, a printer, an input unit, and the like. The storage device 640 is not limited to any particular storage device and may include any known memory device such as RAM, ROM, hard disk, and the like.

According to various embodiments, the storage 640 may store an image of content which includes a plurality of categories of material. The storage 640 may also store synthetic images of the categories of material. The image may be a gray-scale image, a color image, a three-dimensional image, or the like. According to various embodiments, the processor 620 may receive an initial segmentation map generated from the image. In some embodiments, the initial segmentation map includes pixel probability values for each pixel with respect to the plurality of categories. As an example, the pixel map may include a vector of probabilities for each pixel where each category is given a probability such that the summation of the probabilities from the plurality of categories is one.

The processor 620 may execute a refinement predictive model on the initial segmentation map and the image to generate a refined segmentation map. For example, the refinement predictive model may be trained based on synthetic images of the plurality of categories of materials. Accordingly, the processor 620 may generate a segmented image based on the refined segmentation map and output the segmented image for display. Here, the segmented image may be output via the output 630 to an externally connected display, via the network interface 610 to another computing system or display screen connected via a network, or the like.

For example, the synthetic images may include artificially-generated images having a known ground truth. In some embodiments, the synthetic images may include at least one synthetic image that is a dedicated representative image (ground truth) for each category of material from among the plurality of categories of material. In some embodiments, the processor 620 may generate the initial segmentation map of the image via execution of on an initial predictive model trained on real images of the plurality of categories of materials. The synthetic images may be composed based on image templates from a template library.

In some embodiments, the refinement predictive model may include a cascaded neural network that separately processes an RGB or a gray-scale representation of the image and the initial segmentation map, and combines the separately processed results to generate the refined segmentation map. For example, the refinement model may include a processing block for the gray scale image and a processing block for the initial segmentation map. For example, the processor 620 may assign at least one category from among the multiple categories to each pixel. In some embodiments, the executing of the refinement predictive model may significantly improve the accuracy of the initial segmentation map. For example, the refining may cause the processor 620 to convert a pixel categorization included in the initial segmentation map into a sub-pixel categorization in the refined segmentation map As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
   a storage configured to storage an image of content which includes a plurality of categories of data; and
   a processor configured to receive an initial segmentation map of the image, the initial segmentation map comprising pixel probability values with respect to the plurality of categories, and execute a refinement predictive model on the initial segmentation map and the image to generate a refined segmentation map, the refinement predictive model being trained based on synthetic images of the plurality of categories,
   wherein the processor is configured to generate a segmented image based on the refined segmentation map.

2. The computing system of claim 1, wherein the synthetic images comprise artificially-generated images having a known ground truth.

3. The computing system of claim 1, wherein the synthetic images comprise at least one synthetic image dedicated to each category of data from among the plurality of categories of material.

4. The computing system of claim 1, wherein the processor is further configured to generate the initial segmentation map of the image via execution of on an initial predictive model trained on real images of the plurality of categories of data.

5. The computing system of claim 1, wherein the refinement predictive model comprises a cascaded neural network that separately processes a representation similar to the original representation of the image and the initial segmentation map, and combines the separately processed results to generate the refined segmentation map.

6. The computing system of claim 1, wherein the processor is further configured to build the plurality of synthetic images based on image templates.

7. The computing system of claim 1, wherein the processor is configured to assign at least one category of data from among the multiple categories to each pixel.

8. The computing system of claim 7, wherein the executing of the refinement predictive model causes the processor to convert a pixel categorization included in the initial segmentation map into a sub-pixel categorization in the refined segmentation map.

9. A method comprising:
   storing an image of content which includes a plurality of categories of data;
   receiving an initial segmentation map of the image, the initial segmentation map comprising pixel probability values with respect to the plurality of categories;
   executing a refinement predictive model on the initial segmentation map and the image to generate a refined segmentation map, wherein the predictive model is trained and optimized based on synthetic images of the plurality of categories of data; and
   generating a segmented image based on the refined segmentation map.

10. The method of claim 9, wherein the synthetic images comprise artificially-generated images having a known ground truth.

11. The method of claim 9, wherein the synthetic images comprise at least one synthetic image dedicated to each category of data from among the plurality of categories of data.

12. The method of claim 9, further comprising generating the initial segmentation map of the image via execution of on an initial predictive model trained on real images of the plurality of categories of data.

13. The method of claim 9, wherein the refinement predictive model comprises a cascaded neural network that separately processes a representation similar to the original representation of the image and the initial segmentation map, and combines the separately processed results to generate the refined segmentation map.

14. The method of claim 9, further comprising building the plurality of synthetic images based on image templates.

15. The method of claim 9, wherein the generating comprises assigning at least one category from among the multiple categories to each pixel.

16. The method of claim 15, wherein the executing of the refinement predictive model converts a pixel categorization included in the initial segmentation map into a sub-pixel categorization in the refined segmentation map.

17. A non-transitory computer-readable medium comprising:
   storing an image of content which includes a plurality of categories of data;

receiving an initial segmentation map of the image, the initial segmentation map comprising pixel probability values with respect to the plurality of categories;

executing a refinement predictive model on the initial segmentation map and the image to generate a refined segmentation map, wherein the predictive model is trained and optimized based on synthetic images of the plurality of categories of data; and generating a segmented image based on the refined segmentation map.

18. The non-transitory computer-readable medium of claim 17, wherein the synthetic images comprise artificially-generated images having a known ground truth.

19. The non-transitory computer-readable medium of claim 17, wherein the synthetic images comprise at least one synthetic image dedicated to each category of data from among the plurality of categories of data.

20. The non-transitory computer-readable medium of claim 17, wherein the method further comprises generating the initial segmentation map of the image via execution of on an initial predictive model trained on real images of the plurality of categories of data.

* * * * *